United States Patent Office 2,967,155
Patented Jan. 3, 1961

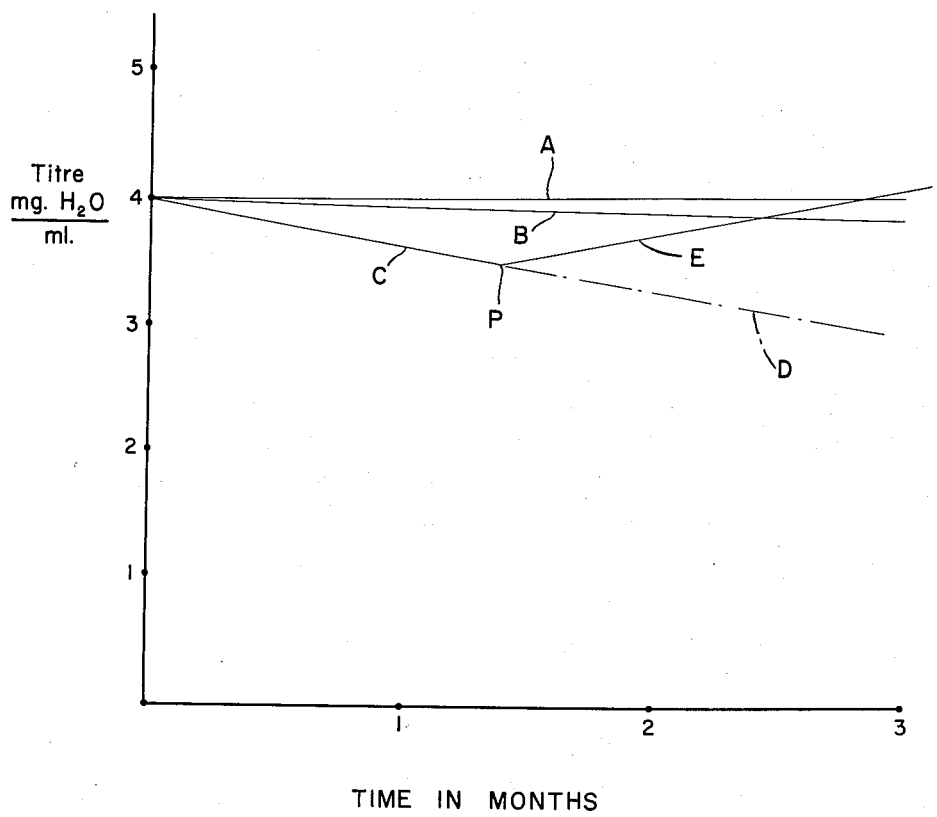

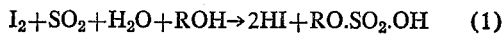

2,967,155

STABILIZED KARL FISCHER REAGENT

Erik Blomgren and Hans Jenner, Uppsala, Sweden, assignors to Aktiebolaget Pharmacia, Uppsala, Sweden, a company of Sweden Filed Nov. 1, 1957, Ser. No. 694,016

Claims priority, application Sweden Nov. 9, 1956

16 Claims. (Cl. 252—408)

This invention relates to the so-called Karl Fischer type of reagents which are widely used for the titrimetric determination of the content of water in solid, liquid and gaseous substances. In its most common form Karl Fischer type reagents contain free iodine and sulphur dioxide dissolved in a non-aqueous solvent, usually a hydroxylated solvent, and generally an accelerator (or accelerating base) is also present in the reagent so as to facilitate its reaction with water.

PRIOR KARL FISCHER REAGENT COMPOSITIONS

As examples of conventional solvents there may be mentioned hydroxylated compounds such as monohydric alcohols, e.g. methanol, ethanol, propanol, butanol, etc.; derivatives of dihydric alcohols e.g. ethyleneglycol-mono-methylether ("methyl Cellosolve") and the corresponding ethyl, propyl, etc. ethers. It is also possible to use mixtures of hydroxylated compounds with each other and also with substances which do not contain any OH-groups (the latter substances being considered "inert" in this connection) e.g. dioxane, chloroform, etc.

The titre of the Karl Fischer reagent depends entirely on the concentration of free iodine; a concentration of 1 mol of $I_2$ per liter corresponding to a titre value of 18 mg. of $H_2O$ per ml. of reagent and other higher or lower concentrations of iodine to proportionally higher or lower titre values. In practice it has proved suitable to choose the titre according to the use for which the reagent is intended, and more particularly in accordance with the estimated amount of water present in the materials to be tested. In the Karl Fischer reagents which are most frequently used the titre is between 1 and 6 mg. of $H_2O$ per ml. of reagent, corresponding to a concentration of free iodine of between 0.05 and 0.33 mol per liter.

The minimum amount of sulphur dioxide which should be present in the reagent depends largely on the concentration of free iodine, as the ratio between the molar concentration of sulphur dioxide and that of free iodine has to exceed the value 1:1. Generally this ratio is much higher than 1:1, is often 3:1; but also may be up to 12:1 or more.

As the accelerating base (or accelerator), a weak base may be used, preferably pyridine. Examples of other weak bases which may be used are aniline, quinoline, dimethylaniline, etc. When one mol of the weak base is equivalent to 1 mol of hydrogen ions, the molar ratio between the concentration of the accelerating base and that of free iodine should exceed the value 3:1. Generally this ratio is chosen considerably higher, often up to 10:1, sometimes 20:1, and even higher.

When a reagent of the composition indicated above containing a hydroxylated solvent is brought in contact with water (e.g. the water present in a sample to be tested) the water reacts with the iodine, sulphur dioxide and hydroxylated solvent so that 1 mol of $H_2O$ consumes exactly 1 mol of $I_2$ producing hydroiodic acid and—if it is assumed that the hydroxylated solvent is a compound of the formula ROH where R is an alkyl group or a substituted alkyl group—alkylsulphuric acid, respectively substituted alkylsulphuric acid, is also formed according to the reaction formula:

$$I_2 + SO_2 + H_2O + ROH \rightarrow 2HI + RO.SO_2.OH \quad (1)$$

DISADVANTAGES OF PRIOR KARL FISCHER REAGENTS

It has been found that Karl Fischer reagents of this kind suffer from a spontaneous decrease of the titre, even if they are stored so that they cannot absorb any moisture from the surrounding. The titre decrease is caused by a spontaneous side reaction which takes place between the iodine, sulphur dioxide and hydroxylated compounds in the reagent and which may be assumed to proceed according to Formula 1 but with the water replaced by an additional molecule of the hydroxylated solvent. This spontaneous titre decrease constitutes a serious disadvantage of the reagents, particularly because of the frequent need of restandardization which it necessitates, and consequently it has therefore long been a strong desire to obviate or eliminate this titre decrease.

To overcome some of these disadvantages, it was proposed in our U.S. Patent 2,780,601 to supply the usual Karl Fischer reagent with a suitable concentration of iodide ions as a stabilizing agent and thereby to reduce the speed of the spontaneous titre decrease so that the titre of the reagent remains substantially unaffected by time. This may be effected either by the addition of a suitable amount of an iodide (such as pyridinium hydroiodide) to the reagent or by addition of water which in the reagent produces iodide ions according to Formula 1.

In the investigations on which the present invention is based it has been found that even reagents containing iodide ions as stabilizing agents in accordance with our above-mentioned patent can sometimes suffer from certain deficiencies in their stability depending upon their method of preparation and conditions of storage. It has been found that a titre stability of about 1% per month can be obtained in reagents which have been stabilized in accordance with the above-mentioned patent, particularly when the reagent is prepared and then immediately stored under such conditions as exist during its use in laboratories, i.e. when the reagent is in contact with air via a drying agent. The titre stability just mentioned (1% per month) can thus be obtained, e.g. by transferring the reagent made in accordance with our prior patent immediately after its preparation to—and keeping it continually in—a container of the type generally used for reagents of this kind in laboratories (see, e.g. Mitchell and Smith, "Aquametry," New York, 1948, page 80, Fig. 14), wherein the reagent has access to air in the way just mentioned.

If a reagent which possesses such a value of the iodide ion concentration as to render its titre practically constant under the above-mentioned conditions (in contact with air via a drying agent) is prepared and immediately transferred to a closed container, e.g. a bottle with a closely fitting stopper (instead of being placed in contact with air via a drying agent) the titre will decrease gradually. If the reagent is then allowed to come into contact with air after having been stored for some time in the absence of air, a gradual increase of the titre takes place. These titre changes may amount to as much as 5-10% per month and cannot be concomitantly eliminated by the process or composition disclosed in said patent. The titre change in the absence of air can be decreased by increasing the iodide concentration but an increased iodide concentration will subsequently result in increased instability when the reagent is exposed to the air.

Therefore, although reagents of the kind described in U.S. Patent 2,780,601 represent a considerable improvement compared to the earlier existing Karl Fischer reagents in which the titre decrease in the presence of air amounted to 15–30% per month, it is obvious that they do not necessarily provide a final answer to the question of stabilizing the Karl Fischer reagent, since the titre constancy of these improved reagents is usually influenced by the storage conditions as just described.

OBJECTS OF THIS INVENTION

The primary object of the present invention is to eliminate said drawbacks and disadvantages and to provide an improved Karl Fischer reagent which has a practically constant titre independent of the manner in which it is stored, i.e. whose titre remains essentially the same both in the presence and in the absence of air.

Another object of this invention is to provide an improved Karl Fischer reagent which contains titre stabilizing agents.

REACTIONS INVOLVED IN REAGENT INSTABILITY

In the course of the investigations which led to the present invention it was found that two different changes of the concentration of free iodine take place concomitantly when a Karl Fischer reagent of the above type is stored in the presence of air. One of these changes consists in the decrease of the concentration of free iodine caused by the above-mentioned side reaction. The other consists in an increase of the concentration of free iodine under the influence of the oxygen of the air which causes an oxidation of the iodide ions in the reagent to free iodine. The spontaneous reaction which causes the concentration of free iodine to decrease proceeds at a slower rate, the higher the concentration of iodide ions is, whereas the speed of the increase of the concentration of free iodine increases with increasing concentration of iodide ions. The titre constancy which as described above can be obtained in a reagent in the presence of air, is the result of these two opposite reactions. By excluding the air from the reagent, the increase in the concentration of free iodine is prevented, and the resulting decrease in the concentration of free iodine results in a decrease of the titre. When the reagent is exposed to air after having been stored for some time in absence of air, the balance between the rates of the two concentration changes is disturbed; because the concentration of iodide ions has increased as a result of the decomposition which has taken place during said storage, the increase of the concentration of free iodine will now proceed more rapidly than in the original reagent, while the decrease of the concentration of iodine for the same reason proceeds at a slower rate, and as a consequence thereof the titre of the reagent will increase progressively.

By continued investigations it has been found that the rate of the spontaneous side reaction which gives rise to the consumption of free iodine cannot be reduced exactly to zero. However, it has been found possible to reduce the rate of the spontaneous decomposition to practically any arbitrarily low value by furnishing an increased amount of iodide ions to the reagent above that amount which would be necessary to merely maintain stability in the presence of air. The reagent will thereby assume a practically constant titre in the absence of air. When such a reagent is exposed to air, however, a rapid increase of the titre will take place, because of the high concentration of iodide ions which is contained in the reagent.

THE INVENTION BROADLY

It has now been found, according to the present invention, that the changes of the titre in a Karl Fischer reagent may be eliminated so that the reagent assumes a practically constant titre in the presence of air as well as in the absence of air, if the reagent, in addition to iodide ions as stabilizing agent, is also supplied with a stabilizing base consisting of a base which has a greater base strength than the above-mentioned accelerating base. In other words, by choosing appropriate concentrations of iodide ions and appropriate concentrations of a stabilizing base for the reagent it is possible to obtain a stabilized reagent, the titre of which only changes in a very slight degree so that the titre practically lies within the margin of the accuracy obtainable in measuring water content by the Karl Fischer method.

THE STRONGER STABILIZING BASES

As examples of such stronger stabilizing bases which have proved particularly suitable in the present invention are the secondary and tertiary amines, e.g. diethylamine, piperidine, diethanolamine, diisopropylamine, triethylamine, and the like. It is also possible to use a mixture of several different amines. Diethanolamine is preferred.

In comparing the strength of the accelerating and stabilizing bases in the medium presented by the reagent, the relative strength of the two bases in aqueous solution has usually been found to be a reliable guide. Thus, since diethylamine, piperidine diethanolamine, diisopropylamine and triethylamine possess a greater base strength than pyridine in aqueous solution, these secondary and tertiary amines have accordingly been found to be suitable for use as stabilizing bases in reagents where the accelerating base consists of pyridine or a substance with about the same base strength as pyridine.

Defining the stabilizing base in another way, it should be a secondary or tertiary amine which has a dissociation constant greater than two powers of ten as compared with the accelerating base. For example, if one uses pyridine which has a dissociation constant of the order of $10^{-9}$, then one should use a stabilizing base which has a dissociation constant greater than $10^{-7}$. However in most instances we have found that secondary and tertiary amines having a dissociation constant greater than $10^{-4}$ are the most satisfactory.

AMOUNTS AND RATIOS OF REAGENT COMPONENTS

As the result of a great number of experiments with the novel reagent compositions of this invention, it has been found that the following broad ranges of amounts may serve as a suitable guide insofar as the various components of the reagent are concerned:

|   | Mols/l. |
|---|---|
| Free iodine | .02 to 0.5 |
| Sulphur dioxide | 0.1 to 3 |
| Iodide ions | .04 to 3 |
| Accelerating base | 0.1 to 6 |
| Stabilizing base | 0.1 to 0.6 |
| Solvent—enough to make up for one liter. | |

The following ranges have been found preferable:

|   | Mols/l. |
|---|---|
| Free iodine | .05 to .4 |
| Sulphur dioxide | .1 to 2 |
| Iodide ions | 0.1 to 2 |
| Accelerating base | .2 to 4 |
| Stabilizing base | 0.1 to 0.4 |
| Solvent—enough to make up for one liter. | |

Insofar as the ratio of the concentrations of the various components in the improved Karl Fischer reagent of this invention is concerned, it has been found that when the concentration of free iodine is between .02 and 0.4 mol per liter and the concentration of a stabilizing base of between about 0.1 and 0.5 mol per liter, a concentration of sulphur dioxide between about 1.5 and 10 times the concentration of free iodine, a concentration of an accelerating base of between about 4 and 20 times the concentration of free iodine, and a ratio of $I^-$ to $I_2$ of between about 1.5 and 6. It should be understood that the concentrations and ratios of the above components may vary depending upon the particular solvent being used. As a general rule it can be said that the ratio of $I^-/I_2$ required to stabilize the reagent decreases with increasing molecular weight of the solvent, the required $I^-/I_2$ ratio being highest with methanol and decreasing in the series methanol, ethanol, propanol, ethylene glycol monomethyl ether, ethylene glycol monoethyl ether, etc.

Although it has been found that the above ranges are quite suitable, it should be understood that amounts of the various components falling outside of the above ranges would not necessarily be inoperative or unsuitable. It is to be understood therefore that the invention should not be limited to the specific ranges set forth above, since it is quite possible for a person skilled in the art, and with the teachings of this invention before him to carry out experiments to find suitable reagent compositions falling partly or wholly outside of the ranges set forth above.

To further illustrate the invention, the following examples are presented for the purpose of showing those skilled in the art the final or actual compositions of a number of specific reagents which were prepared in accordance with this invention. In each case, a liter of the reagent was made and the solvent was added to the other components to make up the full liter. The titre or titre value in each case is in terms of mg. of water per ml. The titre decrease or increase in each instance is the titre decrease in the absence of air and the titre increase in the presence of air. These titre changes were observed over periods ranging from 3 months to 2 years.

*Example 1*

| | |
|---|---|
| Free iodine ($I_2$) | 0.17 mol per liter (M). |
| Sulfur dioxide ($SO_2$) | 0.70 mol per liter. |
| Pyridine (Py) | 0.80 mol per liter. |
| Iodide ions ($I^-$) | 0.67 mol per liter. |
| Piperidine | 0.20 mol per liter. |
| Solvent | Methanol. |
| Titre value | 3.0 mg. of water per ml. |

This titre decreases in the absence of air at about 2.5% per month and increases in the presence of air at about 2% per month.

*Example 2*

| | |
|---|---|
| $I_2$ | 0.17 M. |
| $SO_2$ | 0.50 M. |
| Py | 0.90 M. |
| $I^-$ | 0.56 M. |
| Triethylamine | 0.20 M. |
| Solvent | Methanol. |
| Titre | 3.0. |
| Titre decrease | −2.0% per month. |
| Titre increase | +1.5% per month. |

*Example 3*

| | |
|---|---|
| $I_2$ | 0.22 M. |
| $SO_2$ | 0.60 M. |
| Py | 1.50 M. |
| $I^-$ | 0.90 M. |
| Diethanolamine | 0.20 M. |
| Solvent | Methanol. |
| Titre | 4.0. |
| Titre decrease | −2.0% per month. |
| Titre increase | +2.0% per month. |

*Example 4*

| | |
|---|---|
| $I_2$ | 0.22 M. |
| $SO_2$ | 0.40 M. |
| Py | 2.50 M. |
| $I^-$ | 0.56 M. |
| Diethanolamine | 0.20 M. |
| Solvent | Ethanol. |
| Titre | 4.0. |
| Titre decrease | −1.6% per month. |
| Titre increase | +1.0% per month. |

*Example 5*

| | |
|---|---|
| $I_2$ | 0.25 M. |
| $SO_2$ | 0.90 M. |
| Py | 1.50 M. |
| $I^-$ | 0.50 M. |
| Diethanolamine | 0.20 M. |
| Solvent | Ethylene glycol monomethyl ether. |
| Titre | 4.5. |
| Titre decrease | −1.5% per month. |
| Titre increase | +0.28% per month. |

*Example 6*

| | |
|---|---|
| $I_2$ | 0.23 M. |
| $SO_2$ | 0.85 M. |
| Py | 1.80 M. |
| $I^-$ | 0.54 M. |
| Diethanolamine | 0.30 M. |
| Solvent | Ethylene glycol monomethyl ether. |
| Titre | 4.2. |
| Titre decrease | −1.2% per month. |
| Titre increase | +1.2% per month. |

*Example 7*

| | |
|---|---|
| $I_2$ | 0.32 M |
| $SO_2$ | 0.90 M. |
| Py | 2.50 M. |
| $I^-$ | 0.70 M. |
| Diethanolamine | 0.20 M. |
| Solvent | Ethylene glycol monomethyl ether. |
| Titre | 5.7. |
| Titre decrease | −1.3% per month. |
| Titre increase | +1.0% per month. |

*Example 8*

| | |
|---|---|
| $I_2$ | 0.055 M. |
| $SO_2$ | 0.15 M. |
| Py | 0.30 M. |
| $I^-$ | 0.21 M. |
| Diethanolamine | 0.30 M. |
| Solvent | Methanol. |
| Titre | 1.0. |
| Titre decrease | −1.1% per month. |
| Titre increase | +1.2% per month. |

*Example 9*

| | |
|---|---|
| $I_2$ | 0.22 M. |
| $SO_2$ | 0.80 M. |
| Py | 1.60 M. |
| $I^-$ | 1.17 M. |
| Diisopropylamine | 0.40 M. |
| Solvent | Methanol. |
| Titre | 4.0. |
| Titre decrease | −2.6% per month. |
| Titre increase | +2.2% per month. |

*Example 10*

| | |
|---|---|
| $I_2$ | 0.20 M. |
| $SO_2$ | 1.45 M. |
| Py | 0.80 M. |
| $I^-$ | 1.03 M. |
| Diethylamine | 0.20 M. |
| Solvent | Methanol. |
| Titre | 3.6. |
| Titre decrease | −2.5% per month. |
| Titre increase | +2% per month. |

*Example 11*

| | |
|---|---|
| $I_2$ | 0.17 M. |
| $SO_2$ | 1.10 M. |
| Py | 0.80 M. |
| $I^-$ | 0.58 M. |
| Diethylamine | 0.42 M. |
| Solvent | Ethanol. |
| Titre | 3.0. |
| Titre decrease | −1.8% per month. |
| Titre increase | +1.5% per month. |

Example 12

| | |
|---|---|
| $I_2$ | 0.25 M. |
| $SO_2$ | 1.90 M. |
| Py | 2.00 M. |
| $I^-$ | 1.16 M. |
| Diethanolamine | 0.20 M. |
| Solvent | Propanol. |
| Titre | 4.5. |
| Titre decrease | −1.5% per month. |
| Titre increase | +1.6% per month. |

Example 13

| | |
|---|---|
| $I_2$ | 0.25 M. |
| $SO_2$ | 0.60 M. |
| Py | 2.00 M. |
| $I^-$ | 0.51 M. |
| Diethanolamine | 0.45 M. |
| Solvent | Ethylene glycol monomethyl ether. |
| Titre | 4.5. |
| Titre decrease | −1.2% per month. |
| Titre increase | +1.1% per month. |

Example 14

| | |
|---|---|
| $I_2$ | 0.25 M. |
| $SO_2$ | 0.80 M. |
| Py | 4.50 M. |
| $I^-$ | 0.84 M. |
| Diethylamine | 0.20 M. |
| Solvent | Ethylene glycol monomethyl ether. |
| Titre | 4.5. |
| Titre decrease | −1.2% per month. |
| Titre increase | +1.5% per month. |

Example 15

| | |
|---|---|
| $I_2$ | 0.18 M. |
| $SO_2$ | 2.00 M. |
| Py | 1.80 M. |
| $I^-$ | 0.87 M. |
| Triethylamine | 0.25 M. |
| Solvent | Ethylene glycol monomethyl ether. |
| Titre | 3.2. |
| Titre decrease | −1.2% per month. |
| Titre increase | +1.5% per month. |

Example 16

| | |
|---|---|
| $I_2$ | 0.20 M. |
| $SO_2$ | 0.50 M. |
| Py | 1.80 M. |
| $I^-$ | 0.54 M. |
| Diethanolamine | 0.20 M. |
| Solvent | Ethylene glycol monomethyl ether. |
| Titre | 3.6. |
| Titre decrease | −0.5% per month. |
| Titre increase | +0.8% per month. |

Example 17

| | |
|---|---|
| $I_2$ | 0.05 M. |
| $SO_2$ | 0.50 M. |
| Py | 0.40 M. |
| $I^-$ | 0.11 M. |
| Piperidine | 0.20 M. |
| Solvent | Ethylene glycol monomethyl ether. |
| Titre | 0.9. |
| Titre decrease | −1% per month. |
| Titre increase | +1% per month. |

Example 18

| | |
|---|---|
| $I_2$ | 0.26 M. |
| $SO_2$ | 0.90 M. |
| Py | 2.20 M. |
| $I^-$ | 0.55 M. |
| Diisopropylamine | 0.20 M. |
| Solvent | Ethylene glycol monoethyl ether. |
| Titre | 4.7. |
| Titre decrease | −1% per month. |
| Titre increase | +1% per month. |

THEORY AND CALCULATIONS AS TO AMOUNTS OF COMPONENTS

Although the above specific examples and the recited ranges for the reagent components are quite sufficient to enable anyone skilled in the art to produce an improved and stabilized Karl Fischer reagent for any desired use or condition it is believed worthwhile to set forth here one method whereby one may calculate the amounts of components for any desired strength of reagent if one so desires.

In order to determine the concentration of the stabilizing base which should be present in the reagent, it must first of all be recognized that when the iodine, $SO_2$, solvent and accelerating base components of the reagent are brought together, an almost instantaneous reaction takes place which results in spontaneous consumption of practically ⅓ of the added quantity of free iodine. Furthermore, an additional consumption of free iodine takes place if water is added to provide the reagent with the desired concentration of iodine ions. In both these reactions acids are produced in accordance with the Formula 1 in quantities which are equivalent to the decrease of the concentration of free iodine. It is also to be noted that when the desired iodide ion concentration is obtained by the addition of a soluble iodide which is the salt of hydroiodic acid and a weak base, for example pyridinium hydroiodide, hydroiodic acid is introduced into the reagent in a quantity equivalent to the amount of the added iodide. In determining the total amount of the stabilizing base which should be added to the reagent it has to be observed that all acids originating from the mentioned sources have to be neutralized by the stabilizing base provided that the base of which the soluble iodine is a salt is weaker than the base used to effect the stabilization.

Under these conditions, it has been found that when 1 mol of the stabilizing base is capable of binding 1 mol of free hydrogen ions, the total concentration of the stronger base should exceed the value of the expression $$3([I_2]_0-[I_2])+[E] \qquad (2)$$

where $[I_2]_0$ is the molar concentration of free iodine corresponding to the amount of iodine which has been added in the preparation of the reagent, $[I_2]$ is the actual concentration of free iodine present in the reagent after the above-mentioned iodine-consuming reactions have taken place, and $[E]$ is the concentration of the added soluble iodide. Considering that the free iodine added to the reagent gives rise both to the iodine concentration in the reagent and to the part of the iodide ion concentration which is not supplied by the added iodide, one obtains furthermore:

$$[I_2]_0 = [I_2] + \frac{[I^-]-[E]}{2} \qquad (3)$$

where $[I^-]$ is the iodide ion concentration required for the stabilization of the reagent. From these general formulas the conditions in several special cases differing from the general one can be derived.

If the necessary iodide ion concentration is produced partly by the instantaneous decomposition and partly by addition of water, but without any addition of a soluble iodide, the total concentration of the stabilizing base should thus according to Formula 2 exceed the value $$3([I_2]_0-[I_2]) \qquad (4)$$

and, in accordance with the Formula 3, in this case, the following relation exists $$[I_2]_0 = [I_2] + \frac{[I^-]}{2} \qquad (5)$$

On the other hand, if the reagent has already been supplied with the required iodide ion concentration by the addition of a soluble iodide during the preparation before the free iodine is added, the instantaneous consumption of free iodine according to Equation 1 is prevented. Consequently, in this case, the following relation exists $$[I_2]_0 = [I_2] \qquad (6)$$

and the total concentration of the stabilizing base in this case should exceed the value $$[E] \qquad (7)$$

It has usually been found suitable to add the stabilizing base in a concentration which exceeds the value given by the Formulas 2, 4, and 7 by about 0.1–0.5 mol per liter. If the stabilizing base is capable of binding more than 1 mol of hydrogen ions per mol of base, the concentration of the base should be reduced proportionally to its base-binding capacity.

CONCENTRATION OF IODIDE IONS

In order to practically eliminate the decrease of titre occurring in the absence of air in a reagent which contains the conventional components (iodine, sulphur dioxide, solvent and accelerator) and the said stabilizing base in the concentration stated above, a concentration of iodide ions is required which is given by the following relation between the concentration of iodide ions and the concentration of free iodine.

$$[I^-] = [I_2] + K \qquad (8)$$

where K is expressed in mols/liter. The value of K is dependent upon the concentrations of the sulphur dioxide $[SO_2]$, accelerator $[A]$ and stabilizing base $[B]$ and also upon the nature of the accelerator, solvent and stabilizing base in accordance with the following formula $$K = k \cdot ([A] + \beta[B]) \cdot [SO_2] \qquad (9)$$

The value of the constant $k$ in this formula is dependent on the nature of the solvent and the nature of the accelerator, whereas the constant $\beta$ is exclusively dependent on the nature of the stabilizing base. It should be observed that $[A]$, $[B]$, and $[SO_2]$ are the concentrations which are present in the final reagent after the reactions occurring in the preparation of the reagent have taken place, $[B]$ thus being equal to the amount by which the concentration, in which the stabilizing base has been added, exceeds the values of Formulas 2, 4, and 7. The actual concentrations are easily calculated from the initial concentrations by means of what has already been said about the stoichiometry of the said reactions.

As an example may be mentioned that when the accelerator is pyridine and the solvent a conventional hydroxylated solvent, the constant $k$ has been found to possess values between about 0.10 and 1.20 mols$^{-1}$ liter. As more specific examples, it may be mentioned that in the case of the following solvents, the value of $k$ is within the following ranges valid for room temperature (e.g. 22–25° C.):

|  | Mols$^{-1}$ liter |
|---|---|
| Methanol | 1.20–2.50 |
| Ethanol | 0.50–0.75 |
| Propanol | 0.30–0.40 |
| Ethylene glycol monomethyl ether | 0.15–0.30 |

If the hydroxylated solvent is partly substituted by an inert solvent, the value of $k$ is reduced in proportion thereto.

Formulas 8 and 9 and the values of $k$ given above refer to the case that the spontaneous decomposition amounts to about one percent per month. If it is desired to reduce the decomposition rate to about 0.5 percent per month, the constant $k$ in Formula 9 should be replaced by $$\frac{k}{0.5}$$

If, on the other hand, a decomposition rate of 2 percent per month is tolerable, $k$ in Formula 9 should be replaced by $$\frac{k}{2}$$

Generally, $k$ in Formula 9 should be replaced by $$\frac{k}{\alpha}$$

when the decomposition rate $\alpha$ differs from one percent per month. Under the conditions set forth in this paragraph suitable values of $$\frac{k}{\alpha}$$

have been found to possess values between about 0.10 and 2.50 mols$^{-1}$ liter, and as specific examples it may be mentioned that in the case of the following solvents it has been found suitable to choose the value of $$\frac{k}{\alpha}$$

within the following ranges at room temperature:

|  | Mols$^{-1}$ liter |
|---|---|
| Methanol | .60–1.20 |
| Ethanol | .30–0.50 |
| Propanol | .20–0.30 |
| Ethylene glycol monomethyl ether | 0.15–0.30 |

When the stabilizing base is one of the secondary or tertiary amines mentioned above, the constant $\beta$ has a value between about one and three, preferably 2.

It may be mentioned in this connection that the values of $k$ and $\beta$ are affected by the purity of the components, primarily the purity of the accelerator and the stabilizing base.

The validity of the above-mentioned formulas and values of the concentrations of the stabilizing base and iodide ions which are required for the stabilization of the reagent have been verified experimentally.

With the aid of Formulas 8 and 9 it is possible to calculate the concentration of iodide ions which shall be present in a reagent in order to impart to it an arbitrarily high titre constancy in the absence of air. The values given above for $k$ and $\beta$ allow said calculations to be performed for a great number of reagents of different compositions.

In the cases where the numeric values given above are not applicable it has been found that K in Formula 8 can be determined empirically in the following way: A test solution is prepared wherein the concentration of free iodine is within the above-mentioned interval, and which possesses exactly the same composition with regard to sulphur dioxide, solvent, accelerator and stabilizing base as the reagent for which the K value has to be valid, and wherein the iodide ion concentration is chosen within the above-mentioned intervals. The solution is stored in the absence of air (e.g. under nitrogen) and its titre decrease $\alpha$ in percent per month is determined. By insertion in the formula:

$$[I^-] = [I_2] + \frac{K}{\alpha} \qquad (10)$$

the value of K is calculated. The K value thus obtained is valid for all reagents having this composition with regard to sulphur dioxide, solvent, accelerator and stabilizing base, independent of the specific values of $[I^-]$ and $[I_2]$ for the reagent. By experiments on a few solutions of this kind and applying Formulas 8 and 9, it is possible to cover a large number of reagents with new and different compositions and particularly other solvents than those mentioned above. Generally the observation or examination of each such solution need not to be extended over a longer time than about one month.

The above-mentioned facts relating to the influence of the concentration of the iodide ions on the stability of the reagent can be explained by assuming that the free iodine exists in the reagent in the form of a complex ion $I_3^-$ and that the spontaneous decomposition is caused by the $I_2$-molecules being formed by dissociation of this complex according to the formula:

$$I_3^- = I_2 + I^- \qquad (11)$$

This assumption explains primarily the consumption of ⅓ of the free iodine which takes place instantaneously when the components are brought together; the ratio between the concentration of $I^-$ and $I_2$ which is hereby obtained in the solution corresponds exactly to the $I_3^-$ complex. According to said assumption the effect of the iodide ions is to reduce the dissociation of the $I_3^-$ ion and thereby to decrease the concentration of the $I_2$-molecules which cause the decomposition. This hypothesis is in complete accordance with the observed fact that the rate of the spontaneous decomposition cannot be reduced exactly to zero but can be decreased to an arbitrarily low value, by furnishing a sufficiently high concentration of iodide ions to the reagent.

THE DRAWING

The changes in titre which occur in a reagent according to the invention compared to those occurring in a reagent of the type previously known are schematically illustrated in the accompanying drawing.

Curve A in the drawing indicates the change in titre of a reagent according to this invention in the presence of air and curve B indicates the change of titre for the same reagent in the absence of air. Curve C indicates the change of titre in the absence of air for a reagent stabilized solely by addition of iodide ions in accordance with our earlier mentioned patent. If the latter reagent is stored continually without access to air, its titre will decrease according to D. If air is admitted to the reagent at P, the titre will increase according to E.

As will be seen from the drawing, the changes of the titre of a reagent which has been stabilized according to the present invention lie within a very narrow margin—independent of whether the reagent is stored in the presence or in the absence of air. Reagents can be prepared in accordance with this invention which have a titre decrease of less than 1% per month. As the accuracy which is usually aimed at in water determinations according to the Karl Fischer method is about 1%, it is sufficient to standardize such a reagent only once every second week in order to prevent the error caused by a change of titre to exceed the general error of the determination. With less need for accuracy the interval between the standardizations can be chosen proportionally longer. The analyst is thus practically completely relieved from the time-consuming standardizing work which has heretofore been a characteristic of the Karl Fischer method.

PREPARATION OF REAGENT

In order to prepare a reagent according to the invention the components are brought together in proportions which are chosen so that the reagent will assume the intended final composition and titre. It should be observed that the quantities of free iodine, sulphur dioxide, and stabilizing base suffer a reduction as a result of the reactions which take place during preparation. Said components should therefore be added in quantities which exceed the quantities in which they are to be present in the final reagent by amounts corresponding to the consumption at the preparation. This can readily be determined by calculation. As already pointed out, this consumption can be calculated from what is known regarding the reactions which take place during the preparation. As the released acids will in the first place combine with the stabilizing base, no reduction of the concentration of the accelerator has to be assumed.

In order to provide the reagent with the necessary concentration of iodide ions, either a soluble iodide or water may be added as is disclosed in our prior patent. As indicated above, pyridinium hydroiodide is an example of a suitable iodide. The added quantity of iodide ions, respectively water, has to be chosen so that the iodide ion concentration is increased by the addition from the value produced by the spontaneous reaction to the value required in the final reagent. Generally, it has proved suitable to determine the titre of the solution after the iodine, $SO_2$, solvents, accelerating and stabilizing base components have been brought together, and base the addition of iodide ions, respectively water, upon the result of this determination. If an iodide is added in a sufficient quantity already before the addition of the iodine, there is no consumption of the iodine and no production of iodide ions when the iodine is added as already indicated above.

Further details as to the preparation and calculations relating to Examples 1–7 are given below.

Example 1

In order to prepare 1 liter of the reagent containing methanol as solvent, pyridine as accelerating base and piperidine as the stabilizing base and with a titre value of 3.0 mg. $H_2O$ per ml. corresponding to 0.17 mol of free iodine $[I_2]$ per liter, the actual concentration of the different components in the reagent must first be selected. It is assumed in this example that the iodide ion concentration $[I^-]$ required for stabilizing the reagent is obtained partly from the instantaneous decomposition according to Formula 1 when the components are mixed, and partly from the addition of water. The value of the constant K is calculated according to Formula 9. [A] is in this case equal to the original or starting concentration of pyridine, expressed in mols per liter, and should be at least 3 times $[I_2]$ or 0.51 mol per liter; it is chosen as 0.80 mol per liter. [B], the excess of the stabilizing base, in this case piperidine, is chosen as 0.20 mol per liter. $[SO_2]$, the actual concentration of sulphur dioxide in the stabilized reagent, should be at least equal to $[I_2]=0.17$ mol per liter; it is chosen as 0.70 mol per liter. With the value $$\frac{k}{\alpha}$$

for methanol=0.60 mol$^{-1}$ liter and $\beta=2$, the value of K=0.50 mol per liter is obtained by Formula 9. Consequently, according to the Formula 8 the required iodide ion concentration $[I^-]$ is equal to 0.67 gram ions per liter. The starting or original concentration of free iodine $[I_2]_0$ can now be calculated as being equal to 0.50 mol per liter by Formula 5. The starting concentration of sulphur dioxide $[SO_2]_0$ is equal to $[I_2]_0-[I_2]=0.33$ mol per liter plus the above-mentioned amount of $[SO_2]$, which gives the value 1.03 mols per liter. According to (4), the starting concentration of piperidine $[B]_0$ becomes $3 \cdot ([I_2]_0-[I_2])$ equal to 1.00 mol per liter plus [B], which gives the value of 1.20 mols per liter.

In accordance with the foregoing, 0.50 mol (128 g.) of free iodine, 0.80 mol (63 g.) of pyridine, 1.20 mols (103 g.) of piperidine and 1.03 mols (66 g.) of sulphur dioxide are brought together and methanol is added thereto until the volume is 1 liter, in this case 770 ml. of methanol. The titre of the solution is then determined and is found to be about 6.0 mg. $H_2O$ per ml. The exact titre value found can be designated by the letter $y$. To the solution is added a quantity of $(y-3.0)$ g. $H_2O$, whereby the reagent obtains the titre value 3.0 mg. $H_2O$ per ml. This titre has been found to decrease in the absence of air at about 2.5% per month and to increase in the presence of air at about 2% per month.

Example 2

In order to prepare 1 litre of the reagent with methanol as solvent, pyridine as accelerating base and triethylamine as the stabilizing base and with a titre value of 3.0 mg. $H_2O$ per ml. the actual concentrations of the components are again first decided upon. In this example, it is assumed that the iodide ion concentration $[I^-]$ is obtained exclusively by addition of a soluble iodide, pyridinium hydroiodide. The value of the constant K is calculated according to (9). $[A]$ is in this case the starting concentration of pyridine plus the concentration of the added pyridinium hydroiodide; it is chosen as 0.90 mol per liter. $[B]$ and $[SO_2]$ are chosen as 0.20 mol per liter and 0.50 mol per liter, respectively. With the value $$\frac{k}{\alpha}$$

for methanol=0.60 $mol^{-1}$ liter and $\beta=2$, the value of K=0.39 mol per liter. According to (8) $[I^-]$ is then equal to 0.56 gram ions per liter. The starting conventrations can now be calculated. As the entire iodide concentration is in this case obtained by the addition of the pyridinium hydroiodide, the value of $[I_2]_0$ is according to (6) $[I_2]_0=[I_2]=0.17$ mol per liter. The starting concentration of triethylamine $[B]_0$ is according to (7) equal to $[I^-]=0.56$ mol per liter plus $[B]$, which together give the value 0.76 mol per liter. The amount of pyridinium hydroiodide is equal to $[I^-]=0.56$ mol per liter. $[A]_0$ is equal to $[A]-[I^-]=0.34$ mol per liter (because there is conversion of pyridinium ions from the pyridinium hydroiodide to pyridine when the stabilizing base is added) and $[SO_2]_0=[SO_2]=0.50$ mol per liter.

In accordance with the foregoing, 0.34 mol (27 g.) pyridine, 0.76 mol (77 g.) triethylamine, 0.56 mol (116 g.) pyridinium hydroiodide, 0.17 mol (43.5 g.) iodine and 0.50 mol (32 g.) of sulphur dioxide are brought together and methanol is added thereto until the volume is 1 liter, in this case 800 ml. of methanol. Provided that all of the above-mentioned components are absolutely free from water, a reagent with the titre value of 3.0 mg. $H_2O$ per ml. is obtained. The titre thereof decreases in the absence of an air at about 2% per month and increases in the presence of air at about 1.5% per month.

Example 3

For preparing 1 liter of a reagent containing methanol as solvent, pyridine as the accelerating base and diethanolamine as the stabilizing base and with a titre value of 4.0 mg. $H_2O$ per ml., corresponding to 0.22 mol free iodine $[I_2]$ per liter, in which the required iodide ion concentration $[I^-]$ is produced partly by the instantaneous decomposition of the components when mixed and partly by addition of water, the starting concentrations of the components are determined in the same manner as in Example 1. With $[A]$, $[B]$ and $[SO_2]$ chosen as 1.50 mols per liter, 0.20 mol per liter and 0.60 mol per liter, respectively, and with $$\frac{k}{\alpha}=0.60 \ mole^{-1} \ liter$$

and $\beta=2$, the following starting concentrations are obtained; $[A]_0=[A]=1.50$ mols (118 g.) per liter; $[B]_0=1.55$ mols (163 g.) per liter; $[SO_2]_0=1.05$ mols (67 g.) per liter and $[I_2]_0=0.67$ mol (171 g.) per liter. The components are brought together and methanol is added thereto until the volume is 1 liter, in this case an amount of 685 ml. methanol. The titre value y of the solution is then determined and is about 8.0 mg. $H_2O$ per ml. To the solution is then added (y—4.0) g. $H_2O$, whereby the reagent obtains the titre value 4.0 mg. $H_2O$ per ml. This titre decreases in the absence of air at about 2% per month and increases in the presence of air at about 2% per month.

Example 4

In this case the components in the reagent are the same as in the Example 3 with the exception that the solvent is ethanol. The manner of producing the iodide ions $[I^-]$ for stabilizing the reagent and the titre value of the final reagent $[I_2]$ are also the same as in that example. With $[A]$, $[B]$, and $[SO_2]$ chosen as 2.50 mols per liter, 0.20 mole per liter and 0.40 mols per liter, respectively, and with $$\frac{k}{\alpha}$$

for ethanol=0.30 $mol^{-1}$ liter and $\beta=2$, the following values are obtained for the starting concentrations of the components: $[A]_0=[A]=2.50$ mols (198 g.) per liter, $[B]_0=1.04$ mols (109 g.) per liter and $[SO_2]_0=0.68$ mol (44 g.) per liter and $[I_2]_0=0.50$ mol (128 g.) per liter. The components are brought together and ethanol is added thereto until the amount is 1 liter, in this case 670 ml. of ethanol, whereby a reagent with the titre value y corresponding to about 6.0 mg. $H_2O$ per ml. is obtained. To the solution is added (y—4.0) g. $H_2O$, whereby the reagent obtains the titre 4.0 mg. $H_2O$ per ml. This titre decreases in the absence of air at about 1.6% per month and increases in the presence of air at about 1% per month.

Example 5

In this example ethylene glycol monomethyl ether is used as solvent and diethylamine as the stabilizing base and the titre value of the stabilized reagent should be 4.5 mg. $H_2O$ per ml., corresponding to 0.25 mol free iodine $[I_2]$ per liter. The iodide ion concentration $[I^-]$ required for stabilization is to be produced in the same manner as in the previous examples 1, 3 and 4. With $[A]$, $[B]$, and $[SO_2]$ chosen as 1.50 moles per liter, 0.20 mol per liter and 0.90 mol per liter, respectively, and with $$\frac{k}{\alpha}$$

for ethylene glycol monomethyl ether 0.15 $mole^{-1}$ liter and $\beta=2$, the following starting concentrations of the components are obtained in the same manner as in Example 1: $[A]_0=[A]=1.50$ mols (118 g.) per liter, $[B]_0=0.95$ mol (70 g.) per liter, $[SO_2]=1.13$ mols (74 g.) per liter and $[I_2]_0=0.50$ mol (128 g.) per liter. These components are brought together and methyl Cellosolve is added to the mixture until the volume is 1 liter, which requires 730 ml. of ethylene glycol monomethyl ether. Hereby a reagent with a titre content y of about 6.0 mg. $H_2O$ per ml. is obtained. To the solution is then added an amount of (y—4.5) g. $H_2O$, whereby the reagent obtains the titre 4.5 mg. $H_2O$ per ml. The titre of the reagent decreases in the absence of air at about 1.5% per month and increases in the presence of air at about 0.8% per month.

Example 6

In this case the components in the reagent are the same as in Example 5 with the exception that the stabilizing base is diethanolamine. The manner of producing the iodide ions $[I^-]$ for stabilizing the reagent is also the same but the titre of the stabilized reagent is to be 4.2 mg. $H_2O$ per ml., corresponding to 0.23 mol free iodine $[I_2]$ per liter. With $[A]$, $[B]$, and $[SO_2]$ chosen as 1.80 mols per liter, 0.30 mol per liter and 0.85 mol per liter, respectively, and with $k=0.15$ $mol^{-1}$ liter and $\beta=2$ the following starting concentrations of the components are obtained in the same manner as in Example 1: $[A]_0=[A]=1.80$ (142 g.) per liter; $[B]_0=1.10$ mols (116 g.) per liter; $[SO_2]=1.12$ mols (72 g.) per liter and $[I_2]_0=0.50$ (128 g.) per liter.

These components are brought together and methyl Cellosolve is added to the mixture until the volume is 1 liter in this case 695 ml. of ethylene glycol monomethyl ether, whereby a reagent with a titre value $y$ of about 6.0 mg. $H_2O$ per ml. is obtained. To this solution is added $(y-4.2)$ g. $H_2O$ and the reagent thereby obtains the titre value 4.2 mg. $H_2O$ per ml. This titre decreases in the absence of air at about 1.2% per month and increases in the presence of air at about 1.2% per month.

*Example 7*

In this example the components are the same as in Example 6 and the manner in which the iodide ions $[I^-]$ required for stabilizing the reagent are produced also the same as in the previous example, but the titre of the stabilized reagent is to be 5.7 mg. $H_2O$ per ml., corresponding to 0.32 mol free iodine $[I_2]$ per liter. With [A], [B], and $[SO_2]$ chosen as 2.50 mols per liter, 0.20 mol per liter and 0.90 mol per liter, respectively, and with $$\frac{k}{\alpha} = 0.15 \text{ mole}^{-1} \text{ liter}$$

and $\beta = 2$ the following starting concentrations of the components are obtained in the same manner as in Example 1: $[A]_0 = [A] = 2.50$ mols (198 g.) per liter; $[B]_0 = 125$ mols (131 g.) per liter; $[SO_2]_0 = 1.25$ mols (80 g.) per liter and $[I_2]_0 = 0.67$ mol (171 g.) per liter.

These components are brought together and ethylene glycol monomethyl ether is added thereto until the volume is 1 liter, in this case an amount of 625 ml. ethylene glycol monomethyl ether, whereby a reagent with a titre value $y =$ about 8.0 mg. $H_2O$ per ml. is obtained. To this solution is added $(y-5.7)$ g. $H_2O$, and the reagent thereby obtains the titre value 5.7 mg. $H_2O$ per ml. This titre decreases in the absence of air at 1.3% per month and increases in the presence of air at about 1% per month.

While there have been described what are at present considered to be the preferred embodiments of this invention, it will be obvious to those skilled in the art that various changes and modifications may be made therein without departing from the invention, and it is therefore our intention in the appended claims, to cover all such changes and modifications as fall within the true spirit and scope of the invention.

What is claimed is:

1. A stabilized Karl Fischer reagent comprising, dissolved in a conventional solvent, free iodine, sulfur dioxide, iodide ions, a conventional accelerating base with weak base character selected from the group consisting of pyridine, quinoline, aniline and dimethyl aniline, and a stabilizing base consisting of an organic nitrogen compound with a greater base strength than said accelerating base, the free iodine, sulfur dioxide and accelerating base being present in conventional concentrations, the ratio of the concentration of iodide ions to the molecular concentration of free iodine being between about 1.5 and 6, and the concentration of the stabilizing base being at least 0.1 mole per liter and no more than 0.6 mols per liter, said reagent having a stable titre both in the absence and presence of air.

2. A stabilized Karl Fischer reagent comprising free iodine and sulfur dioxide in conventional concentrations, iodide ions an organic hydroxylated solvent, a conventional accelerating base with weak base character selected from the group consisting of pyridine, quinoline, aniline and dimethyl aniline, and a stabilizing base selected from the group consisting of secondary and tertiary aliphatic amines with greater base strength than said accelerating base, the free iodine, sulfur dioxide and accelerating base being present in conventional concentrations, the ratio of the concentration of iodide ions to the molecular concentration of free iodine being between about 1.5 and 6, and the concentration of the stabilizing base being at least 0.1 mole per liter and no more than 0.6 mols per liter, said reagent having a stable titre both in the absence and presence of air.

3. A stabilized Karl Fischer reagent according to claim 2, wherein the stabilizing base is piperidine.

4. A stabilized Karl Fischer reagent comprising free iodine and sulfur dioxide, a hydroxylated solvent, a conventional accelerating base with weak base character selected from the group consisting of pyridine, quinoline, aniline and dimethyl aniline, and a stabilizing base selected from the group consisting of secondary and tertiary aliphatic amines with a greater base strength than said accelerating base, said components being present in the following amounts:

| | Mols/liter |
|---|---|
| Free iodine | .02 to .5 |
| Sulfur dioxide | 0.1 to 3 |
| Iodide ions | .04 to 3 |
| Accelerating base | 0.1 to 6 |
| Stabilizing base | 0.1 to 0.6 |

Solvent—enough to make up to one liter.

5. A stabilized Karl Fischer reagent according to claim 4, wherein said stabilizing base is diethylamine.

6. A stabilized Karl Fischer reagent according to claim 4, wherein said stabilizing base is diethanolamine.

7. A stabilized Karl Fischer reagent according to claim 4, wherein said stabilizing base is diisopropylamine.

8. A stabilized Karl Fischer reagent according to claim 4, wherein said stabilizing base is triethylamine.

9. A stabilized Karl Fischer reagent containing a solvent selected from the group consisting of methanol, ethanol, propanol and ethylene glycol monomethyl ether, a conventional accelerating base with weak base character selected from the group consisting of pyridine, quinoline, anilene and dimethyl aniline, and a stabilizing base selected from the group consisting of secondary and tertiary aliphatic amines with a greater base strength than said accelerating base, and having a concentration of free iodine of between 0.05 and 0.4 mole per liter, a concentration of sulfur dioxide between about 1.5 and 10 times the concentration of free iodine, a concentration of the accelerating base of between about 4 and 12 times the concentration of free iodine, a concentration of the stabilizing base of between about 0.1 and 0.5 mol per liter, and a ratio of $[I^-]$ to $[I_2]$ of between about 1.5 and 6.

10. A stabilized Karl Fischer reagent according to claim 9 wherein the stabilizing base is diethylamine.

11. A stabilized Karl Fischer reagent according to claim 9 wherein said stabilizing base is diethanolamine.

12. A stabilized Karl Fischer reagent according to claim 9 wherein said stabilizing base is diisopropylamine.

13. A stabilized Karl Fischer reagent according to claim 9 wherein said stabilizing base is triethylamine.

14. A stabilized Karl Fischer reagent containing a solvent selected from the group consisting of methanol, ethanol, propanol and ethylene glycol monomethyl ether, a conventional accelerating base, and a stabilizing base consisting of piperidine, and having a concentration of free iodine of between 0.05 and 0.4 mole per liter, a concentration of sulfur dioxide between about 1.5 and 10 times the concentration of free iodine, a concentration of an accelerating base of between 4 and 12 times the concentration of free iodine, a concentrtion of stabilizing base of between about 0.1 and 0.5 mol per liter, and a ratio of $[I^-]$ to $[I_2]$ of between about 1.5 and 6.

15. 15. A stabilized Karl Fischer reagent for the determination of water comprising free iodine, sulfur dioxide, a hydroxylated organic solvent and a conventional accelerating base with weak base character selected from the group consisting of pyridine, quinoline, aniline and dimethyl aniline, the said reagent also containing iodide ions and a stabilizing base selected from the group consisting of secondary and tertiary aliphatic amines with a greater base strength than said accelerating base, said reagent having a stable titre both in the absence as well as in the presence of air due to the presence in the reagent of said stabilizing agents, and wherein the iodide ion concentration expressed in gram ions per liter, has a value corresponding to the equation:

(1) $\qquad [I^-] = [I_2] + K$ and the concentration of the said stabilizing base, expressed in gram equivalents per liter, exceeds the value of the expression (2) $\qquad 3([I_2]_0 - [I_2]) + E$ by an amount of 0.1–0.5 mol/liter, in which formulas $[I_2]_0$ is the molar concentration of the iodine originally added in the preparation of the reagent, $[I_2]$ is the molar concentration of the free iodine present in the reagent, $[I^-]$ is the iodide ion concentration in the reagent, $[E]$ is the molar concentration of soluble iodide added for producing iodide ions when the base which has been supplied by the iodide to the reagent is weaker than said stabilizing base, and k is a constant the value of which is determined by the equation:

(3) $\qquad K = k(A + B[B])[SO_2]$ where $k$ is a constant the value of which is determined by the nature of the solvent, $\beta$ is a constant the value of which is determined by the nature of the stabilizing base, [A] and [SO₂] are the actual concentrations in the reagent of accelerating base and sulphur dioxide, respectively, and [B] is the amount by which the concentration of the stabilizing base exceeds the value of Expression 2 above, the value of $\beta$ being between 1 and 3, and the value of $k$ being between 0.1 and 2.5 mole$^{-1}$ liter, the specific values of $k$ for methanol, ethanol and ethylene glycol monomethyl ether being 0.6–2.5 mole$^{-1}$ liter, 0.30–0.75 mole$^{-1}$ liter, and 0.15–0.30 mole$^{-1}$ liter, respectively.

16. A stabilized Karl Fischer reagent according to claim 15 wherein the stabilizing base consists of piperidine.

References Cited in the file of this patent

UNITED STATES PATENTS 2,780,601    Blomgren et al.  ---------- Feb. 5, 1957